(12) United States Patent
Schüttinger

(10) Patent No.: US 6,999,248 B2
(45) Date of Patent: Feb. 14, 2006

(54) MAGNIFYING OPTICAL SYSTEM WITH A VARIABLE COLOR LED

(75) Inventor: Alfred Schüttinger, Heroldsberg (DE)

(73) Assignee: A. Schweizer GmbH Optische Fabrik, Forchheim (DE)

( * ) Notice: Subject to any disclaimer, the term of this patent is extended or adjusted under 35 U.S.C. 154(b) by 0 days.

(21) Appl. No.: 10/926,420

(22) Filed: Aug. 25, 2004

(65) Prior Publication Data

US 2005/0036191 A1 Feb. 17, 2005

Related U.S. Application Data

(63) Continuation of application No. PCT/DE03/00373, filed on Feb. 8, 2003.

(30) Foreign Application Priority Data

Feb. 27, 2002 (DE) ............... 102 08 447

(51) Int. Cl.
*G02B 27/02* (2006.01)
(52) U.S. Cl. .................. 359/803; 359/802; 359/819
(58) Field of Classification Search ........ 359/798–803, 359/819
See application file for complete search history.

(56) References Cited

U.S. PATENT DOCUMENTS

| | | | | |
|---|---|---|---|---|
| 6,322,226 B1 * | 11/2001 | Dickson | ...................... | 362/33 |
| 6,384,988 B1 | 5/2002 | Müller et al. | | |
| 6,483,651 B1 * | 11/2002 | Maurer | ...................... | 359/819 |
| 2002/0145813 A1 * | 10/2002 | Jung et al. | .................. | 359/798 |
| 2005/0024530 A1 * | 2/2005 | Schuttinger | ................. | 348/375 |

FOREIGN PATENT DOCUMENTS

| | | |
|---|---|---|
| DE | 298 22 189 U1 | 10/1999 |
| DE | 199 50 899 A1 | 6/2001 |
| DE | 199 38 926 U1 | 7/2001 |
| GB | 2 348 968 A | 10/2000 |

* cited by examiner

*Primary Examiner*—Ricky Mack
(74) *Attorney, Agent, or Firm*—Laurence A. Greenberg; Werner H. Stemer; Ralph E. Locher

(57) ABSTRACT

A magnifying optical system, e.g. a magnifying visual aid such as a magnifying lens, a reading glass, magnifying or telescopic spectacles, contains a holding device for the magnifying element and an illuminating element which is connected to a source of energy and is embodied as at least one LED. The at least one LED is configured as a color LED, the color of which can be modified. A color control switch modifies the color of the at least one color LED is assigned to the optical system.

20 Claims, 4 Drawing Sheets

MAGNIFYING OPTICAL SYSTEM WITH A VARIABLE COLOR LED

CROSS-REFERENCE TO RELATED APPLICATION

This is a continuing application, under 35 U.S.C. §120, of copending international application No. PCT/DE03/00373, filed Feb. 8, 2003, which designated the United States; this application also claims the priority, under 35 U.S.C. §119, of German patent application No. 102 08 447.5, filed Feb. 27, 2002; the prior applications are herewith incorporated by reference in their entirety.

BACKGROUND OF THE INVENTION

Field of the Invention

The invention relates to a magnifying optical system, specifically a magnifying optical vision aid such as a magnifying glass, reading glasses, magnifying goggles, or telescopic goggles, having a holder for the magnifying element or elements and an illumination element. The illumination element is connected to a power source and is in the form of at least one LED. A system such as this is known, for example, from Published, Non-Prosecuted German Patent Application DE 199 38 926 A1 and from German Utility Patent DE 298 22 189 U1, and is provided with an illumination element in the form of an LED, which is supplied with voltage via a power source which is disposed in the handle of the system.

In the case of the apparatuses according to the prior art which, for example, may be in the form of a handheld magnifying glass, magnifying goggles or telescopic goggles, one or more LEDs are provided which, for example, throw white light onto the object which can be viewed by the optical system. Each of the apparatuses according to the prior art is also provided with a switching device, in order to switch the illumination element on and off.

SUMMARY OF THE INVENTION

It is accordingly an object of the invention to provide a magnifying optical system with a variable color LED which overcomes the above-mentioned disadvantages of the prior art devices of this general type, in which the illumination device can easily be matched to different requirements.

With the foregoing and other objects in view there is provided, in accordance with the invention, a magnifying optical system. The magnifying optical system contains at least one magnifying element, a power source, a holder securing the magnifying element, and an illumination element connected to the power source and secured to the holder. The illumination element has at least one color LED outputting a color that can be varied. A control switch drives the at least one color LED for varying the color output by the at least one color LED.

The object is achieved in that the at least one LED is a color LED whose color can be varied, and the optical system has an associated color control switch for varying the color of the at least one color LED.

The apparatus according to the invention particularly advantageously results in that a user can use the illumination device when viewing an object to set an optimum contrast for him, since the human retina reacts to quite specific color combinations in a particularly contrast-sensitive manner. This differs from user to user, for which reason continuously variable color temperature matching leads to illumination results which can be optimized. The color control switch is provided in order to set the color of the light from the color LED. A color control switch such as this can be used to drive the three primary colors of red, blue and green, which are generally present, of a color LED that is known per se, and to match the brightness ratio of the primary colors to one another as required. It is thus possible to produce an infinite number of colors, and to emit them with high intensity owing to the power of the color LED. One color LED which can be used advantageously for the invention is, for example, known under the designation "Full-Color-RGB-LED-5 mm" and is marketed, for example, by Conrad Elektronik GmbH under the order number 185353-22, Type LF 59. The forward voltages of this diode are stated to be 1.7 V for the color red, 2.2 V for the color green and 3.0 V for the color blue. The current is 20 mA, and the wavelengths are as follows: red—660 nanometers, green—565 nanometers, blue—470 nanometers. The user of the system can set the color that appears to give the best contrast for him by using the color control switch to mix the colors as appropriate, and this is also dependent on the color and/or the surface structure of the object to be illuminated.

In principle, it is possible to dispose the color control switch on an element of the optical system, for example on a housing part or on a handle. Since, on the basis of experience, elderly operators in particular may, however, have difficulties with excessively small control elements, it is also possible for the color control switch to be in the form of a separate housing unit which is electrically operatively connected to the optical system, that is to say which interacts with the optical system either via a cable or by a transmitting and receiving apparatus. The control elements on a separate housing element may be relatively large and, furthermore, this results in the weight of the magnifying optical system itself being reduced, which may be particularly worthwhile when the magnifying optical system is worn on the head, for example as magnifying goggles or telescopic goggles.

In principle, it is admittedly possible to use the color control switch to drive the LED directly. However, it is also within the scope of the invention for the color control switch to be connected to an electronic color control circuit that drives the color LED. The color control switch may be in the form of at least one slide regulator, and it is within the scope of the invention for each primary color of the color LED to have a separate associated slide regulator.

In addition, it is advantageous for the illumination element to have at least one white light LED in addition to the at least one color LED, which white light LED can be switched on as required. A switching-on element in the form of a push button can be provided for the group of color LEDs and for the group of white light LEDs, and this is particularly advantageous because color temperatures can remain set on the color control switch even when the illumination device is switched off. The slide regulators and the push button or push buttons are advantageously disposed on a handle, in such a way that, for example, they can be operated with the thumb of the user resting on the handle. It is also within the scope of the invention to provide a switching-on electronic circuit, which is connected to only one switching-on push button and which is configured such that, for example, only the at least one white light LED has the operating voltage applied to it when it is operated for the first time, only the color light LED has the operating voltage applied to it when it is operated for a second time, and both the white light LED group and the color LED group have the operating voltage applied to them when it is operated for the third time. It is, of course also possible to switch on the color LEDs when it is operated for the first time, all of the LEDs when it is operated for a second time, and only the white light LED group when it is operated for a third time. Specifically, any desired sequence may be used. Owing to the restricted spatial conditions on a handle, single-button switching is regarded as being advantageous.

Additionally or alternatively, it is possible to provide the color control switch with a menu button, which is connected to a memory or processor device. Previously stored illumination settings or illumination profiles can be called up via such a menu button, thus providing the user with the capability, for example, to store one type of illumination for reading newspapers, a further type for looking at plastic objects, and a third for looking at high-gloss papers and the like.

It is also possible to configure the color control switch, the push button or push buttons and the LEDs together with a voltage supply as a module that can be fitted to an optical system and/or can be replaced.

Other features which are considered as characteristic for the invention are set forth in the appended claims.

Although the invention is illustrated and described herein as embodied in a magnifying optical system with a variable color LED, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
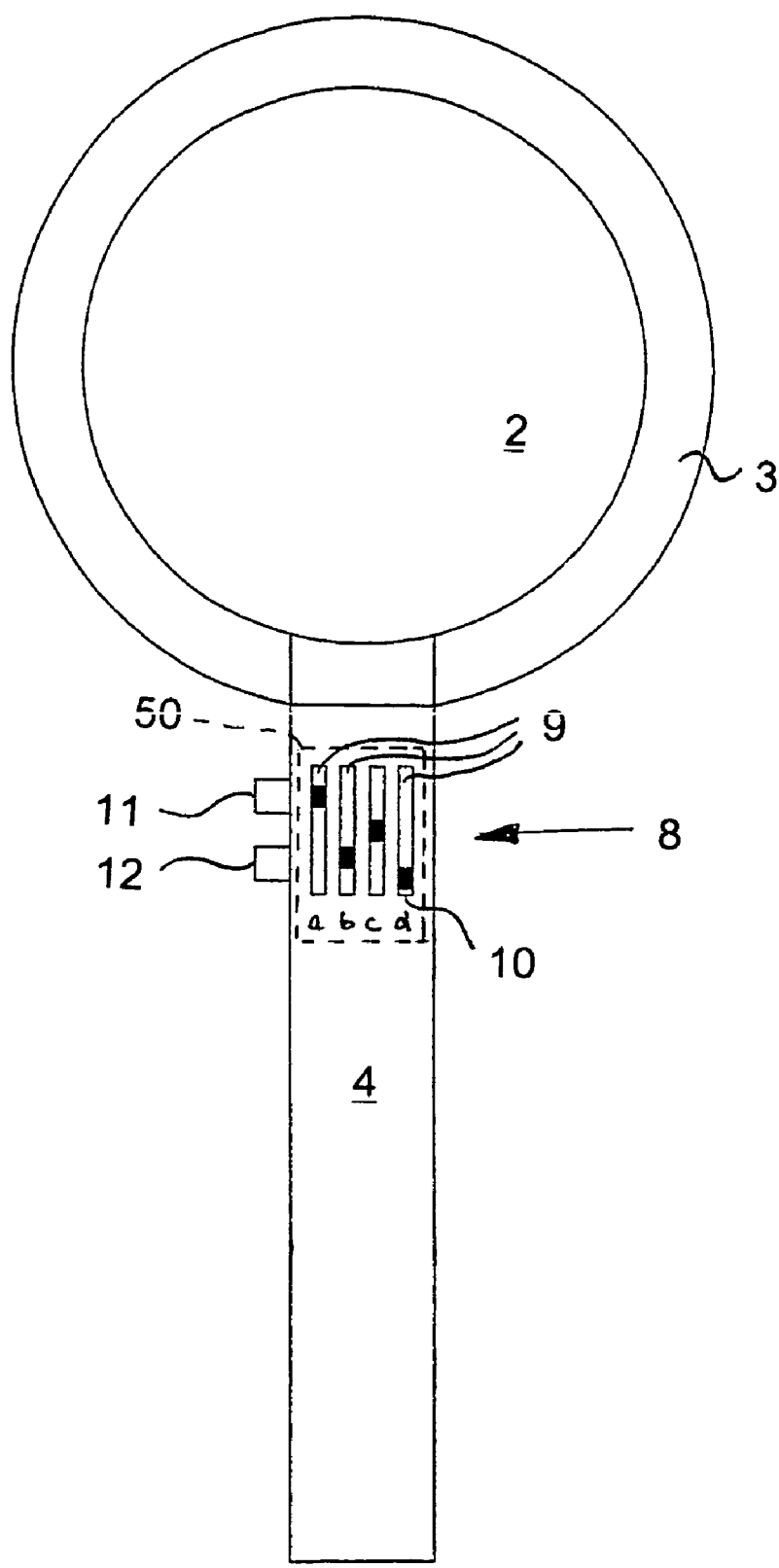
FIG. 1 is a diagrammatic, top plan view of an optical system that is in the form of a magnifying glass according to the invention.
Figure 3:
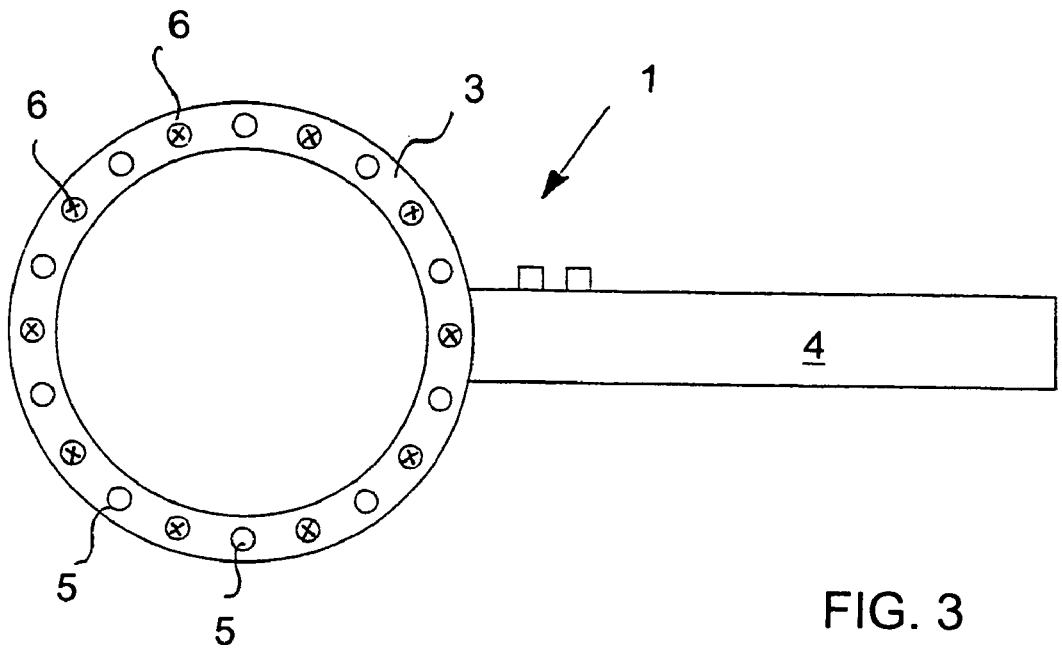
FIG. 3 is a bottom plan view of the system shown in FIGS. 1 and 2.
Figure 2:
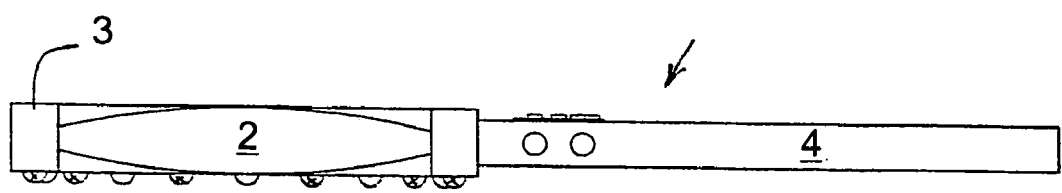
FIG. 2 is a side-elevational view of the system shown in FIG. 1.
Figure 4:
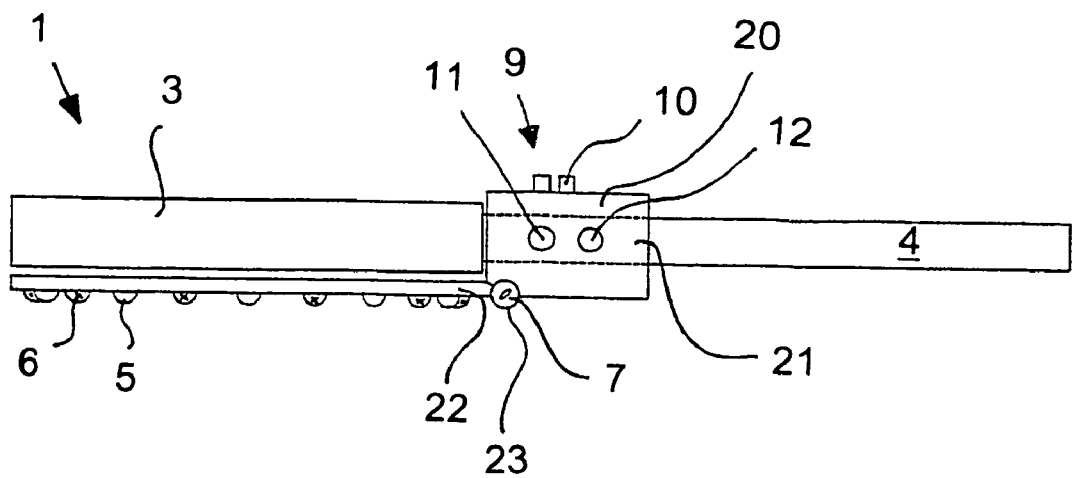
FIG. 4 is a side-elevational view of a modular refinement of the invention, which is fitted to a magnifying glass.

Referring now to the figures of the drawing in detail and first, particularly, to FIG. 1 thereof, there is shown an optical system in a form of a magnifying glass 1 having a magnifying lens 2 which is mounted in an annular holder 3. A handle 4 is disposed on the holder 3, and its end that faces the magnifying lens 2 merges into the holder 3. An illumination element that has two or more LEDs 5, 6 is provided on the holder 3 (see FIG. 3). The LEDs 5, 6 are disposed in a circular manner in the holder 3. The LEDs 5 are white light LEDs, the LEDs 6 are color LEDs whose color is variable. Batteries or rechargeable batteries are provided in the handle 4 in order to supply voltage to the LEDs 5, 6, and represent a power source 7 for the LEDs 5, 6 (FIG. 4). A color control switch 8 is disposed in the area of the handle 4 in order to adjust the color, and is electrically connected to a color control circuit 50 which drives the at least one color LED 6. The color control switch 8 has two or more slide regulators 9a–c, 10, with the slide regulators 9a, b, c being associated with the primary colors red, green, blue of the color LED 6. The slide regulator 10 is used to regulate the intensity of the white light LEDs 5. In order to make it possible to switch the color LEDs 6 on in their preselected color, a switching-on element 11 is provided, which is in the form of a push button or a push button switch and is fitted to the handle 4 at the side such that it can easily be operated by the thumb. A further switching-on element 12, which is in the form of a push button or push switch, is likewise used to switch on the white light LEDs 5. This has the advantage that, once the intensity has been preset by the slide regulator 10, it need not be changed in order to switch on the white light LEDs 5.

In the exemplary embodiment illustrated in FIG. 4 of the drawing, the control switches 9, 10, the push buttons 11, 12 and the LEDs 5, 6 are in the form of a module 20 which can be fitted to a conventional magnifying glass and in which, additionally, the power source 7 is also accommodated. In detail, the module 20 contains a first annular section 21, which can be plugged over the handle 4 of the hand held magnifying glass 1 and is fitted with the power supply 7 on its lower face. An LED mount 22 is provided on the annular section 21 in the plugging-on direction, that is to say parallel to the holder 3 for the magnifying glass 1, and entirely or partially surrounds the magnifying lens 2 peripherally on its side facing the object.

Fundamentally, it is also possible to attach the LED without an LED mount 22 directly to the section 21 or to a housing 23 of the power source 7, and in the process to provide an emission angle which is suitable for illumination of the object with high contrast.

Figure 5:
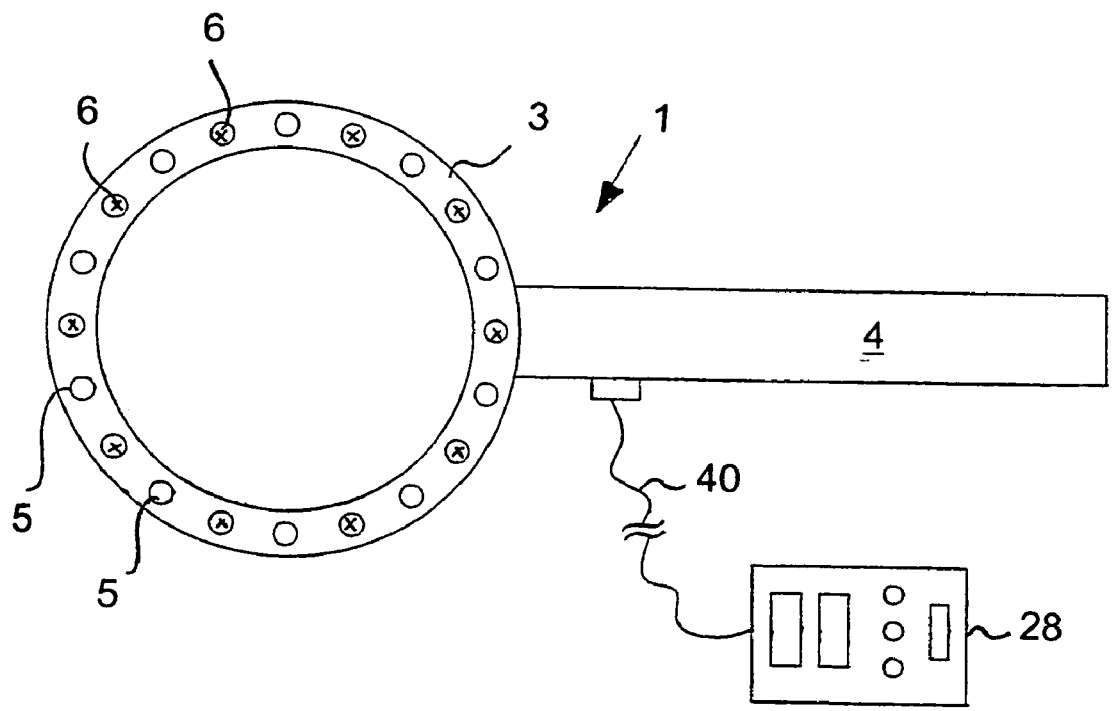
FIG. 5 is a plan view of the system shown in FIGS. 1 and 2, in which the color control switch is in a separate housing unit.
Figure 6:
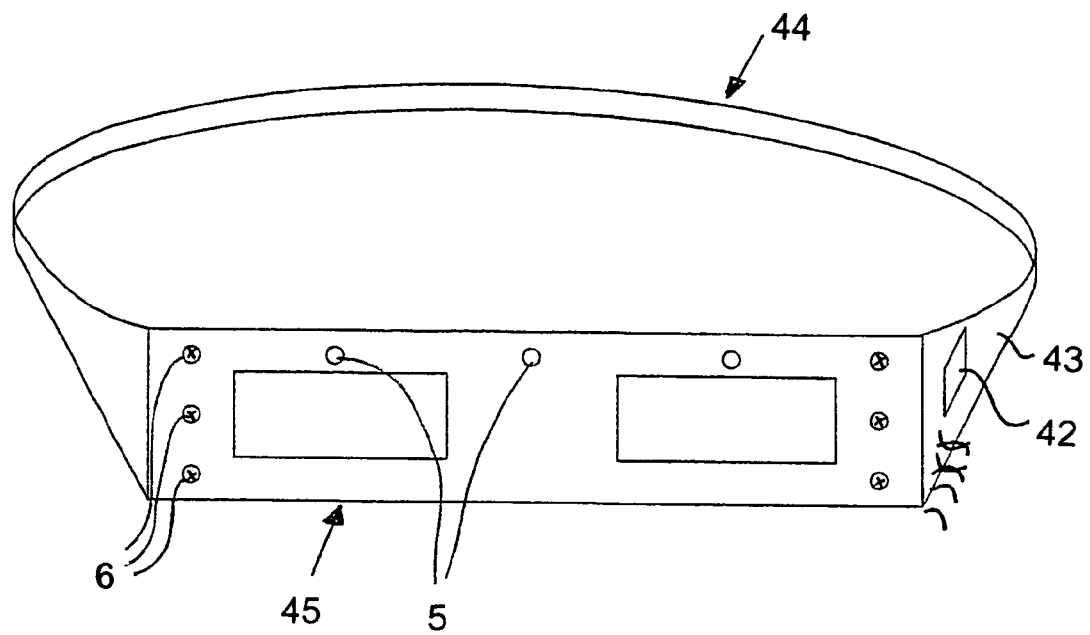
FIG. 6 is an illustration of a magnifying optical system in the form of magnifying goggles, in which the color control switch is in a separate housing unit.
Figure 6:
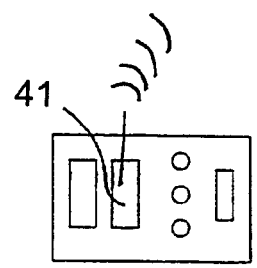

FIGS. 5 and 6 show magnifying optical systems in the form of a handheld magnifying glass (FIG. 5) and magnifying goggles (FIG. 6), in which a color control switch 28 is in a separate housing unit. In the exemplary embodiment illustrated in FIG. 5, the color control switch 28 is connected to the magnifying glass 1 via a cable 40. In the exemplary embodiment illustrated in FIG. 6, a transmission element 41 is disposed in the color control switch 28 and a receiver 42 is disposed in a side frame 43 of magnifying goggles 44, in order to drive the color LEDs 6 and the white light LEDs 5 in a front area 45 of the magnifying goggles 44.

I claim:

1. A magnifying optical system, comprising:
   at least one magnifying element;
   a power source;
   a holder securing said magnifying element;
   an illumination element connected to said power source and secured to said holder, said illumination element having at least one color LED each outputting a color that can be varied; and
   a control switch driving said at least one color LED for varying the color output by each of said at least one color LED.

2. The magnifying optical system according to claim 1, wherein said control switch is disposed on a component of the magnifying optical system.

3. The magnifying optical system according to claim 1, wherein said control switch is a separate housing unit, and is electrically operatively connected to said at least one color LED.

4. The magnifying optical system according to claim 3, wherein said control switch has a cable connected to said at least one color LED.

5. The magnifying optical system according to claim 3, wherein:
said holder has a receiving device; and
said control switch has a transmission device interacting with said receiving device.

6. The magnifying optical system according to claim 1, further comprising a color control circuit connected between said control switch and said at least one color LED for driving said at least one color LED.

7. The magnifying optical system according to claim 1, wherein said control switch is a slide regulator.

8. The magnifying optical system according to claim 1, wherein said control switch has at least two slide regulators.

9. The magnifying optical system according to claim 6, wherein said control switch has a regulator for influencing a brightness of said at least one color LED.

10. The magnifying optical system according to claim 9, wherein said regulator is electrically connected to said color control circuit.

11. The magnifying optical system according to claim 1, wherein said illumination element has at least one white light LED in addition to said at least one color LED.

12. The magnifying optical system according to claim 1, wherein said control switch has a slide regulator for each primary color of said at least one color LED.

13. The magnifying optical system according to claim 8, further comprising a switching-on element being a push button disposed on said holder.

14. The magnifying optical system according to claim 13, wherein:
the magnifying optical system is selected from the group consisting of magnifying glasses and reading glasses; and
said holder has a handle on which said slide regulators and said push button are disposed.

15. The magnifying optical system according to claim 11, further comprising push buttons for separately turning on said at least one color LED and said at least one white light LED.

16. The magnifying optical system according to claim 1, wherein said illumination element has at least one white light LED in addition to said at least one color LED;
further comprising a push button disposed on said holder for turning on at least one white light LED and said at least one color LED; and
further comprising a switching-on electronic circuit connected to said push button and configured such that, when said push button is operated for a first time, only said at least one white light LED has an operating voltage applied to it, when said push button is operated for a second time only said at least one color LED has the operating voltage applied to it, and when said push button is operated for a third time both said at least one white light LED and said at least one color LED have the operating voltage applied to them.

17. The magnifying optical system according to claim 1, wherein said control switch has at least one menu button, connected to a memory/processor device, for selection of previously stored illumination settings or profiles.

18. The magnifying optical system according to claim 1, wherein said illumination element has at least one white light LED in addition to said at least one color LED;
further comprising a push button for turning on said at least one color LED and said at least one white light LED; and
wherein said control switch, said push button, said at least one white light LED, and said at least one color LED are in a form of a module fitted to said holder in a replaceable or releaseable manner.

19. The magnifying optical system according to claim 1, wherein said control switch has at least one slide regulator.

20. The magnifying optical system according to claim 1, wherein the magnifying optical system is selected from the group consisting of magnifying optical vision aids, magnifying glasses, reading glasses, magnifying goggles, and telescopic goggles.

* * * * *